(12) United States Patent
Brown

(10) Patent No.: US 6,499,666 B1
(45) Date of Patent: Dec. 31, 2002

(54) OIL COOLER BYPASS VALVE

(75) Inventor: Lanny D. Brown, Lexington, MI (US)

(73) Assignee: Huron, Inc., Lexington, MI (US)

( * ) Notice: Subject to any disclaimer, the term of this patent is extended or adjusted under 35 U.S.C. 154(b) by 0 days.

(21) Appl. No.: 09/945,037

(22) Filed: Aug. 31, 2001

(51) Int. Cl.$^7$ .................................................. F01P 7/02
(52) U.S. Cl. ................................ 236/34.5; 236/99 K
(58) Field of Search ...................... 236/34, 34.5, 93 R, 236/93 A, 99 J, 99 K

(56) References Cited

U.S. PATENT DOCUMENTS

| | | | | |
|---|---|---|---|---|
| 3,754,706 A | * | 8/1973 | Tao | 236/34 |
| 3,913,831 A | * | 10/1975 | Talak | 236/34.5 |
| 4,360,055 A | * | 11/1982 | Frost | 165/167 |
| 4,398,662 A | * | 8/1983 | Costello | 236/34.5 |
| 6,012,550 A | * | 1/2000 | Lee | 236/24.5 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

A valve actuating mechanism for a transmission/engine fluid cooler bypass valve of the type in which a responsive element expands to urge a valve member against a valve seat thereby causes transmission fluid to flow through an oil fluid cooler. A cast valve housing is utilized which is interposed between the cooler and the oil source. The valve actuating mechanism is designed to allow fluid pass through the valve once the fluid has reached an elevated temperature.

19 Claims, 7 Drawing Sheets

OIL COOLER BYPASS VALVE

FIELD OF THE INVENTION

The present invention relates to oil cooler bypass valves, and more particularly to a bypass valve which is couplable to an oil source which is thermally responsive to changes in oil temperatures.

BACKGROUND OF THE INVENTION

Oil cooler bypass valves are used in conjunction with engines, transmissions, power steering systems, and hydraulic systems. They are designed to provide a flow path by which oil passing to the valve from the oil source is returned without passing through a heat exchanger during warm-up periods.

Typical transmission bypass valves have several connecting joints and complicated return features which increases costs and the likelihood of failures caused by leaks. In most prior art systems, the valve member is an integral part of a thermally responsive element which expands to cause the valve member to engage the valve seat. Once seated such a valve member is susceptible to at least two malfunctions. It is impossible to unseat the valve member to relieve excessive system pressures which may occur if the valve ports are improperly connected to the cooler or in the event the oil line is damaged or blocked or the cooler itself has become inoperable. Secondly, the components of the bypass valve are often damaged when the thermally responsive element continues to expand, which sometimes occurs when the cooler is overloaded and the oil heats excessively. Such damage can include cracking of the valve member mounting, or internal failure of the valve components. In either case the bypass valve is unfit for further service.

SUMMARY OF THE INVENTION

According to the present invention, an oil/fluid cooler bypass valve is provided for use in conjunction with a cooling system of the type which includes a manifold type valve housing having a valve chamber communicating with an oil/fluid supply, fluid return, cooler supply, and cooler return lines. A valve member having a cooling position for directing fluid from the fluid supply line to the cooler supply line for circulation through a cooler, and then from the cooler return line to the oil return line. The valve has a warm-up position for directing oil from the oil supply line back to the oil return line, thus bypassing the heat exchanger.

The valve actuation mechanism of the present invention is operative to move the valve member between its warm-up and cooling positions and comprises an element responsive to changes in temperature or pressure of the fluid prior to entry to the cooler. The responsive element is integral with the valve member. The valve member is enclosed with a manifold which is fastened directly to the oil containing body. In one embodiment of the invention, the manifold is directly seated against the oil containing body.

In another embodiment of the present invention, the valve body has a pair of integral input and output ports. Machined into the cavity about the ports are a pair of notches configured to accept O-ring seals. These O-ring seals function to seal the ports when they are bolted directly onto the oil containing body.

In another embodiment of the present invention, an insertable valve element is disclosed. The valve element has a component which is responsive to changes in temperatures.

The thermal component has a first valve bearing surface which mates upon a first valve seat within the valve body and a second bearing element which seals a second valve seat. Disposed between the first valve seat and an annular flange on the thermal element is a first spring which functions to bias the first bearing surface against the first valve seat at temperatures above a pre-determined level. A second bi-pass spring is disposed between the thermal element and the mounting member. The mounting member is used to fixably couple the valve element within the valve body.

In yet another embodiment of the present invention, the valve element having a sliding valve component is disclosed. The sliding valve component has an axial through bore which mates to an outer surface of a thermal element. The sliding valve member further has a through passage which regulates the flow of oil through the valve.

Other objects and features of the invention will become apparent from consideration of the following description taken in connection with the accompanying drawings.

DETAILED DESCRIPTION OF THE PREFERRED EMBODIMENTS

Figure 1:
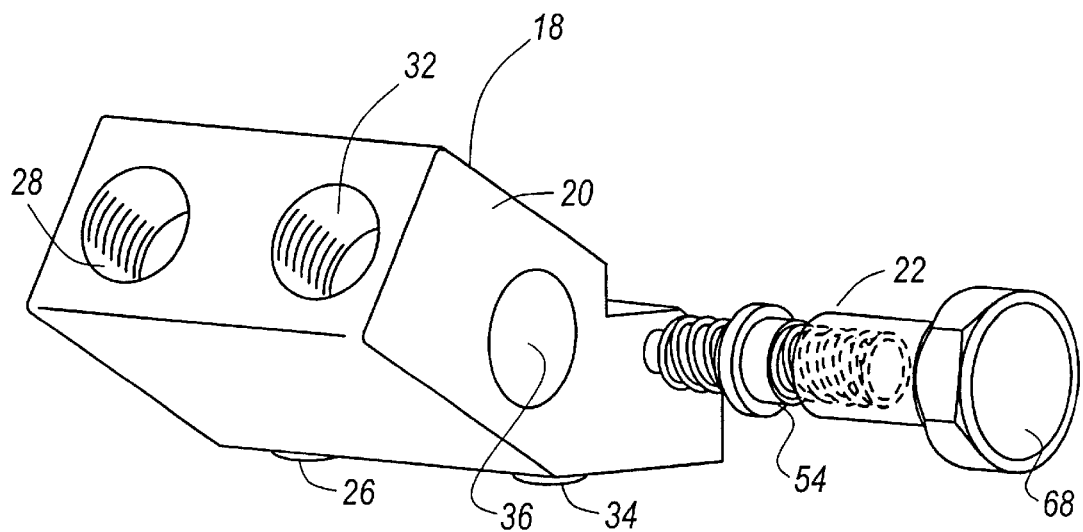
FIG. 1 is an exploded perspective view of a first embodiment of the present invention.
Figure 2:
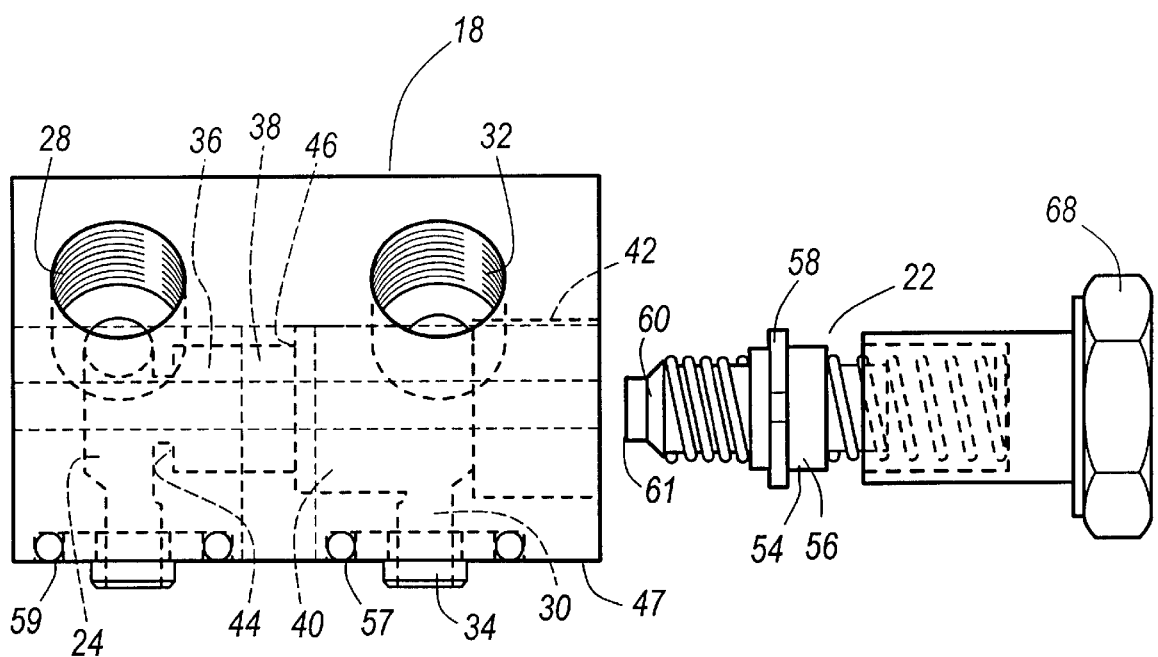
FIG. 2 is an exploded side view of the bypass valve of FIG. 1.

Referring now to FIGS. 1–6, there is illustrated a fluid cooler bypass valve 18 which can be connected to a transmission, engine or power steering fluid pump. The valve 18 is primarily formed by a housing 20 and valve element 22. The housing 20 defines a heat exchanger bore 24 having an input port 26 and a heat exchanger output port 28. The housing further defines a fluid return bore 30 having a return input port 32 and a return output port 34. Disposed between the heat exchanger bore 24 and the return bore 30 is a bypass passage 36. The bypass passage 36 is configured to accept the valve element 22. The bypass passage 36 has a first portion 38 having a first diameter and a second portion 40 having a second diameter which is greater than the first diameter. A threaded portion 42 facilitates the coupling of the valve element 22 to the housing 20.

The first portion 38 is fluidly coupled to heat exchanger bore 24 through a first valve seat 44. Disposed between the first portion 38 and the second portion 40 is a second valve seat 46. After assembly, the bypass valve 18 is bolted through the mounting bore 48 to the body of the oil supplying unit (not shown). Both the input port 26 and the return output port 34 are directly fastened to output ports of the oil supplying unit (not shown). Each port 26 and 34 have a port flange 52 which facilitates the coupling of the housing 20 to the output and input ports oil supply. Disposed on the mounting surface 47 of the housing 20 is a pair of annular grooves 59 about the ports 26 and 34. These annular grooves 59 accept gaskets 50 which fluidly seal the ports 26 and 34.

The valve element 22 according to the first embodiment of the present invention includes a generally cylindrical thermal element 54. The thermal element 54 is constructed of a central member 56 and an exterior star flange 58. The star flange 58 axially and radially supports the position of the thermal element 54. The thermal element 54 further has a first valve bearing element 60 at the thermal element's distal end 61. The first valve bearing element 60 interacts with the first valve seat 44 in the housing 20. Disposed between the first valve bearing element 60 and the star flange 58 is a spring which generally biases the valve element 22 in its closed position.

The valve element 22 further has a second spring 64 disposed between the star flange 58 and an interior bearing surface 66 of a mounting member 68. The mounting member 68 is constructed of a base portion 70 having a hex cap 72. The base portion 70 defines a bore 74 with the interior bearing surface 66.

As previously indicated in the description of the prior art, the purpose of the bypass valve 18 is to receive heated fluid from a transmission or engine by means of input port 26 and to return the fluid through return output port 34 before the fluid is passed through a heat exchanger during warm-up periods such as when the oil temperature is at a temperature of 160° F., or less. When the oil fluid temperature exceeds 160° F., at least a portion of the oil is directed by the valve 18 to the cooler (not shown) by means of the heat exchanger bore 24 through heat exchanger output port 28. The cooled oil passes from the cooler (not shown) by means of return input port 32 to the valve 18 and back to the oil source by means of return output port 34. At temperatures above 180° F., essentially all of the oil is routed through the cooler (not shown). It should be understood that these temperatures are merely exemplary and are not critical to the operating limits.

Figure 3:
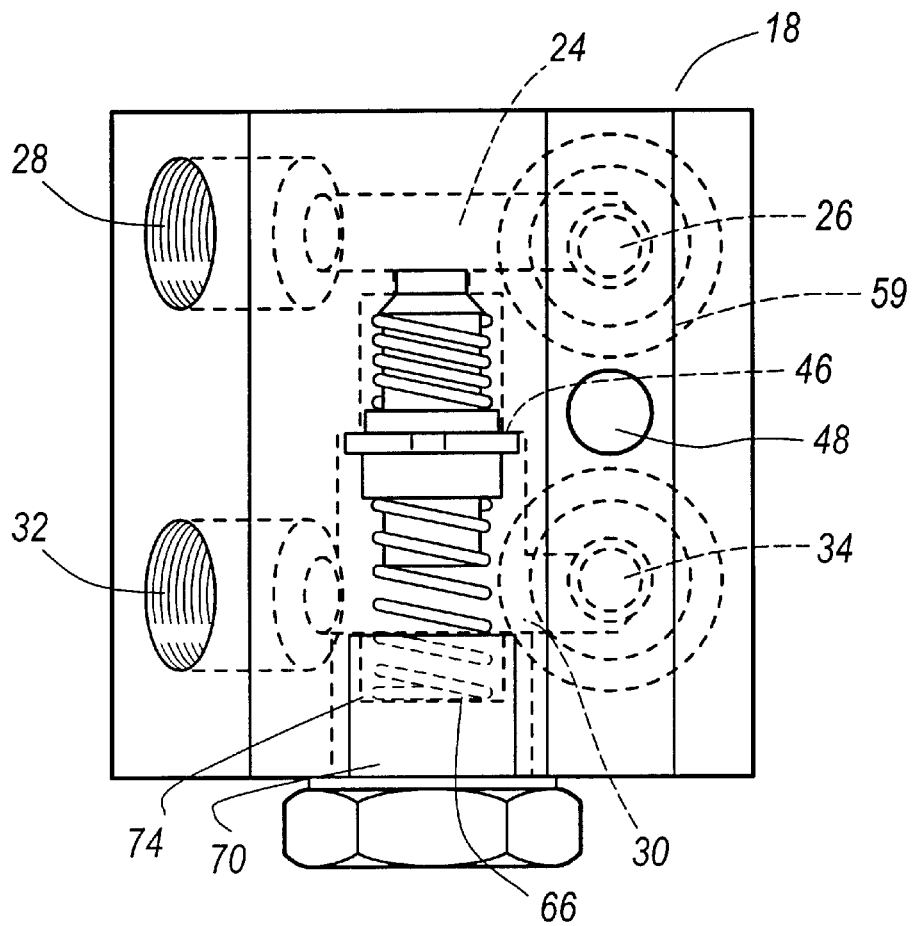
FIG. 3 is a top view of an assembled bypass valve in its closed position.
Figure 4:
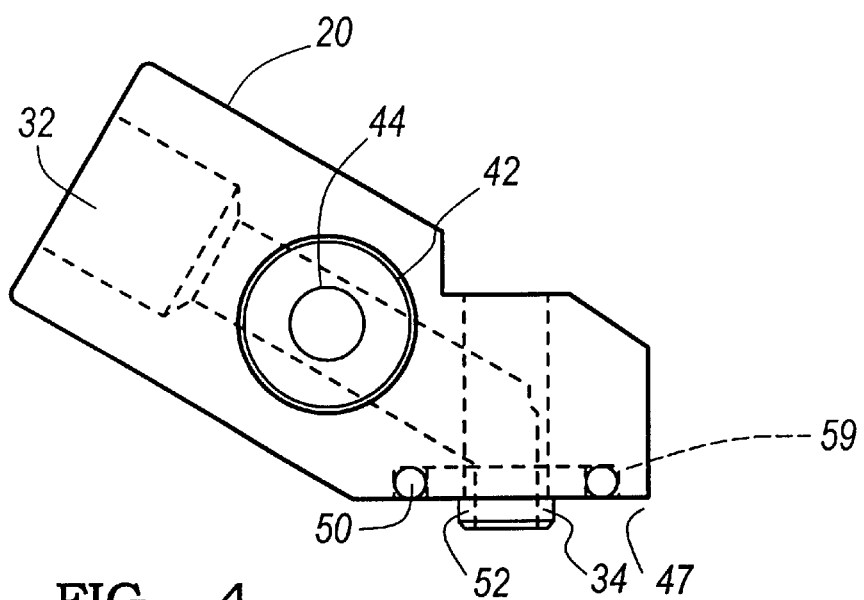
FIG. 4 is a side view of the valve housing of the present invention.

FIG. 3 depicts a top view of the valve assembly 18 according to the first embodiment of the present invention. Shown is the valve element 22 in its closed position. As can be seen, the first valve bearing element 60 is positioned so that the first valve seat 44 is closed. In this configuration, fluid will flow in through the input port, through the heat exchanger bore 24 and to the heat exchanger through heat exchanger output port 28. After cooling, the fluid will flow into the bypass valve through return input port 32 and to the oil source by return output port 34. The first and second springs 62 and 64 function to bias the valve in this position.

Figure 5:
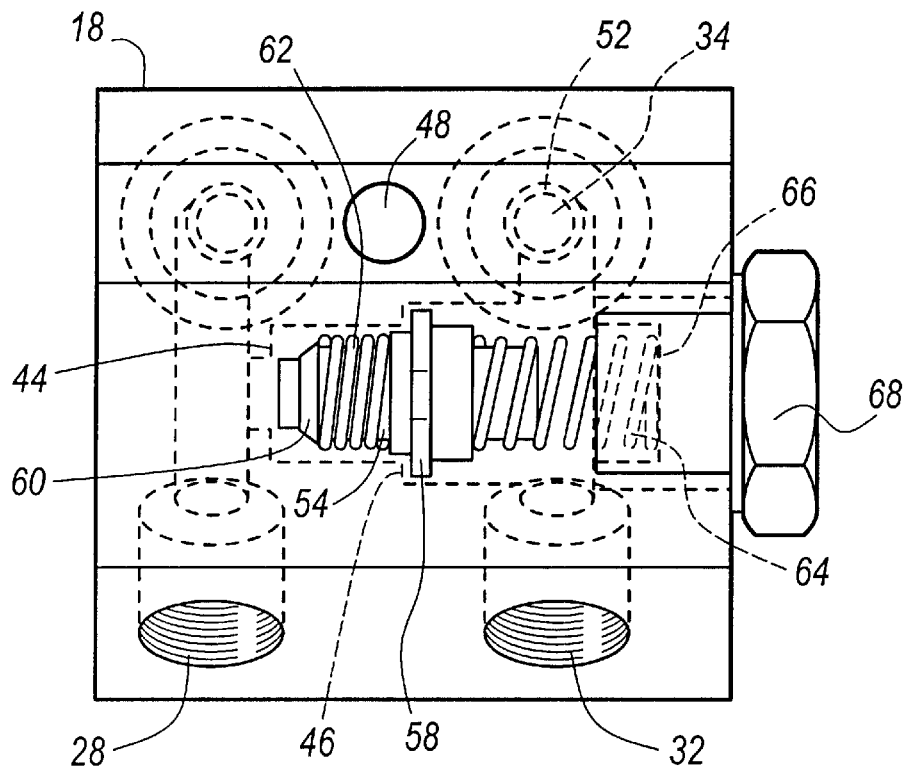
FIG. 5 is a top view of the valve assembly is an open warm-up position.
Figure 6:
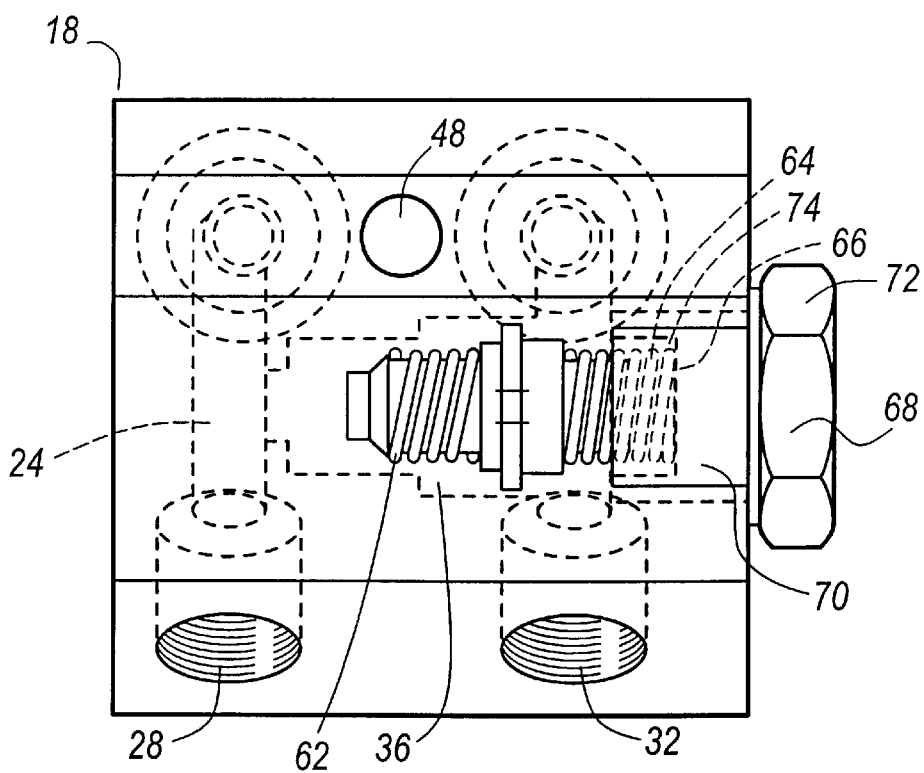
FIG. 6 is a top view of the valve assembly of valve 1 in its bypass position.

As can be seen in FIG. 5, when the thermal element 54 is lower than a temperature of approximately 180°, the thermal element retracts the first valve bearing element 60 away from the first valve seat 44. Fluid is then allowed to pass through the notches in the star flange 58, along side the thermal element 54, through the bypass passage 36, and into the return bore 30. As previously mentioned, heat exchangers can plug, causing a malfunction in the cooling system. Rather than prevent flow of the engine oil, thus causing permanent damage to the engine, the valve assembly 18 of the present invention has an integral bypass function. As best can be seen in FIG. 6, upon the plugging of the oil cooler (not shown), the pressure and temperature of the fluid within heat exchanger bore 24 increases substantially. This increased pressure causes the second spring 64 to be compressed, thus allowing passage of fluid from the heat exchanger bore 24 through bypass passage 36 into return bore 30. This bypass feature forms a rapid warm-up system which contains a safety relief in the event of a catastrophic failure of any of the cooling system components.

Figure 7:
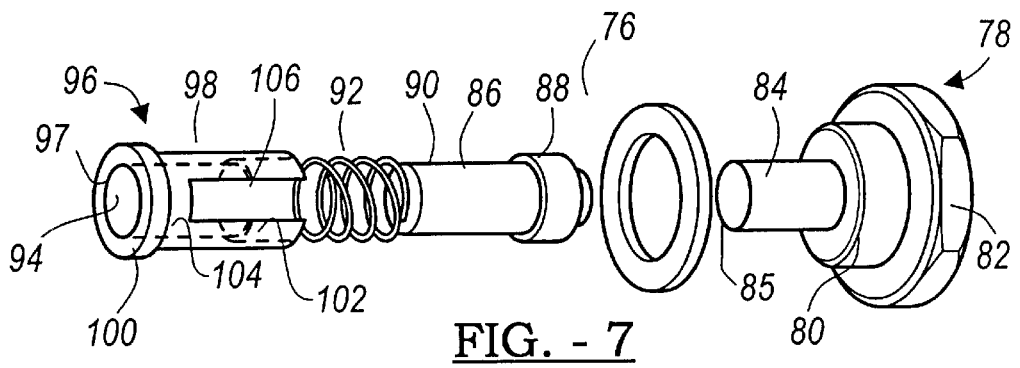
FIGS. 7 and 7a are an exploded view of the valve elements of a second embodiment of the present invention.

FIG. 7 represents an exploded view of a valve element 76 according to a second embodiment of the present invention. Shown is a mounting member 78 having a base 80 and a hexagonal endcap 82. The mounting member 78 further has an axially disposed engagement member 84. Engaged to the bearing surface 85 of the engagement member 84 is the thermal unit 86. The thermal unit is generally cylindrical having an annular flange 88 disposed on its outer surface 90. Further disposed about the outer surface 90 is a first helical spring 92. The thermal unit is slid into a through bore 94 of a sliding valve element 96.

The sliding valve element 96 is generally cylindrical having an exterior surface 98 having a first diameter. Disposed on the distal end 97 of the sliding valve member 96 is an annular ring 100 which has a diameter greater than the first radius of the exterior surface 98. The annular ring 100 functions to couple to interior surface 101 of bypass passage 36.

Figure 7A:
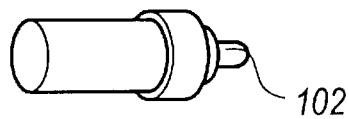

FIG. 7a depicts a thermal unit 86 in its engaged position. When the thermal unit 86 reaches a predetermined temperature, for example 180° F., it deploys a first piston member 102. Deployment of piston 102 functions to move the thermal unit 86 within the bypass passage 36 with respect to the outer elements of valve element 76.

Figure 8:
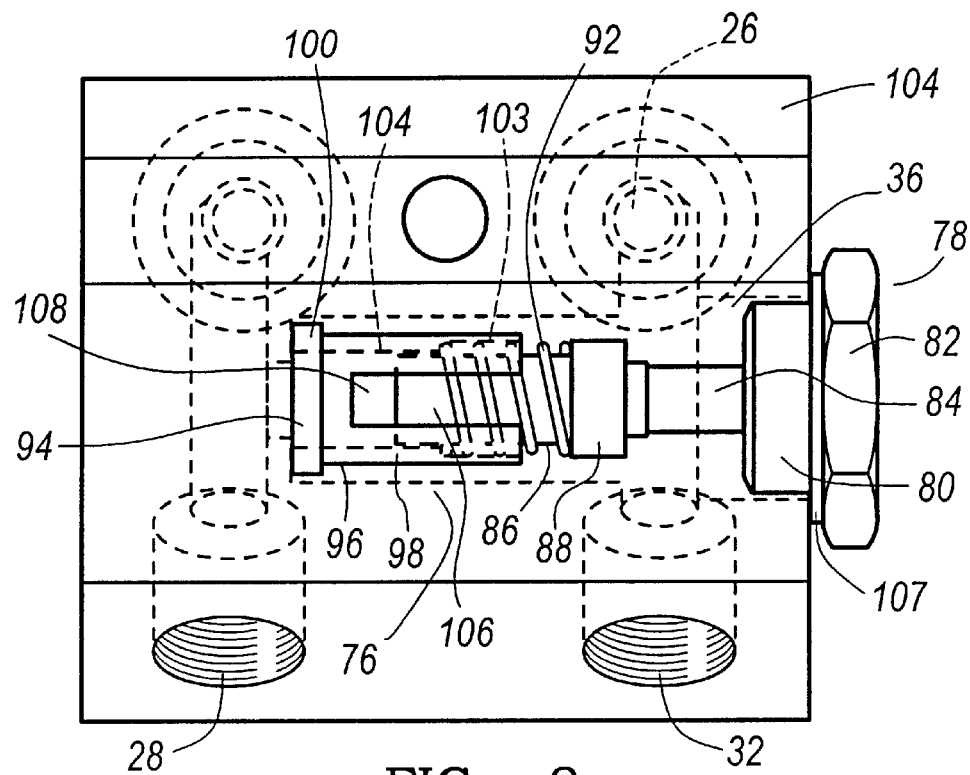
FIG. 8 is a view of an assembled valve assembly using the valve elements according to the second embodiment of the present invention in their open position.
Figure 9:
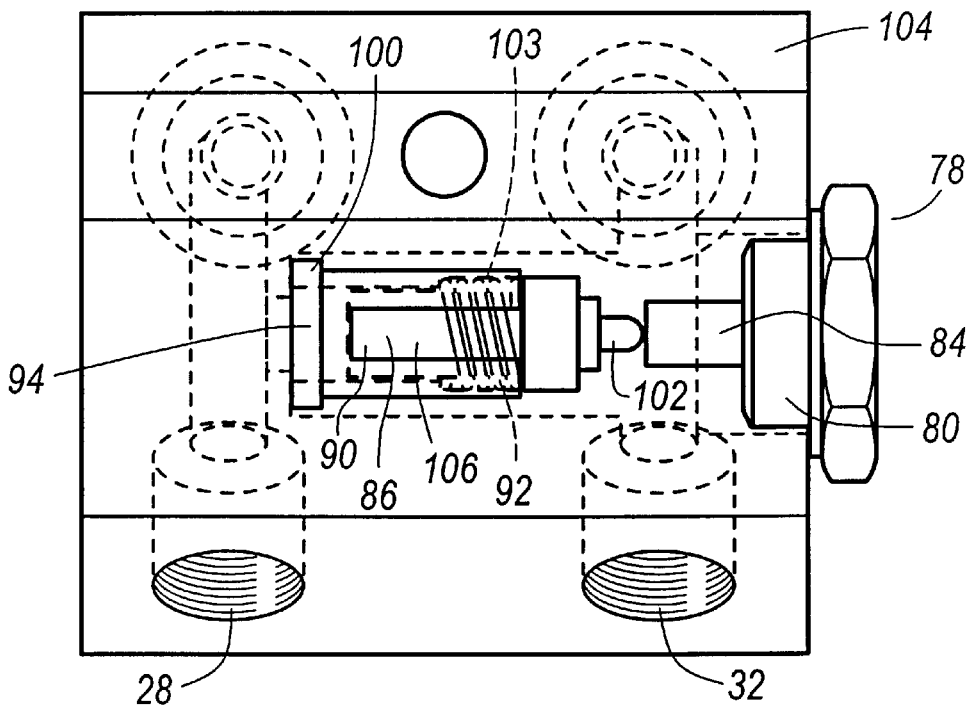
FIG. 9 is a top view of a valve assembly utilizing the valve elements according to the second embodiment of the present invention in its closed position.

FIG. 8 depicts the valve element 76 shown in FIG. 7 assembled into valve housing 104. Mounting member 78 functions to sealably enclose the elements of valve element 76 within bypass passage 36. As can be seen, the exterior surface 90 of thermal unit 86 is disposed within the first helical spring 92. A portion of the first helical spring 92 is disposed within a first portion 103 of through bore 94. First helical spring 92 is coupled against annular flange 88 of the thermal unit 86. As can be seen, when the thermal unit 86 is below about 180° F., a flow passage 108 is opened in the slot 106. As shown, fluid is allowed flow from input port 26 through the bypass passage 36 through output port 32.

When the thermal unit 86 reaches a temperature of about 180° F., the first piston 102 is deployed and engages against a surface of engagement member 84. This forces the body of thermal unit 86 further into the through bore 94 closing off the flow passage 108. Although a slot 106 is shown, flow passage 108 can take the form of a hole formed through the exterior surface 98 of the sliding valve element 96 into the through bore 94. Once the temperature of the oil drops below about 180° F., the piston 102 compresses first helical spring 92 and forces the thermal member toward the mounting member 78 re-opening flow passage 108. This again allows fluid to flow from input port 26 to output port 32 through bypass passage 36.

Figure 10:
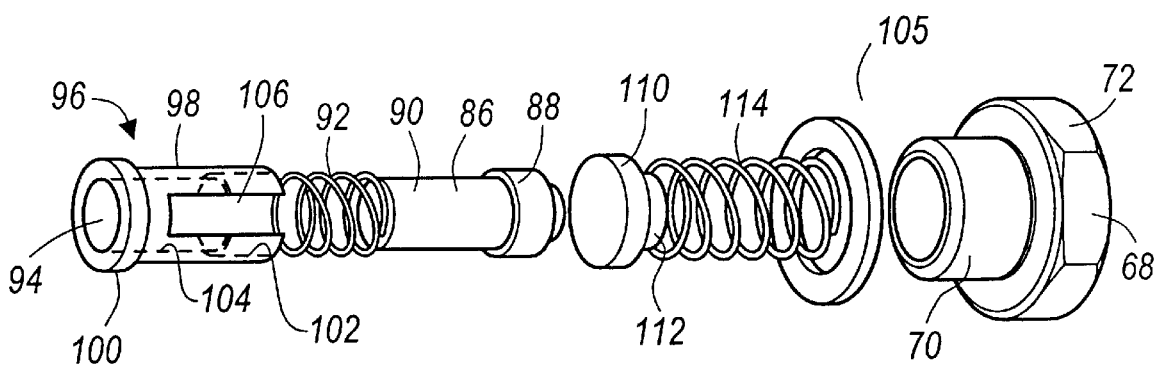
FIGS. 10 and 10a are exploded views of the valve elements according to a third embodiment of the present invention.
Figure 10A:
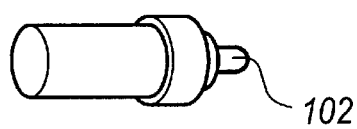

FIG. 10 discloses an exploded view of a valve assembly 105 according to the third embodiment of the present invention. The third embodiment has the sliding valve element 96, intermediate first helical spring 92, and thermal element 86. Additionally, the valve assembly 105 of the third embodiment has an intermediate bearing member 110. The intermediate bearing member 110 has a cylindrical portion 112 which allows it to couple to a second helical spring 114. The second helical spring 114 is mounted within the base portion 70 of the mounting member 78. FIG. 10a depicts the thermal unit having a deployed piston member 102 as is also shown in FIG. 7a.

Figure 11:
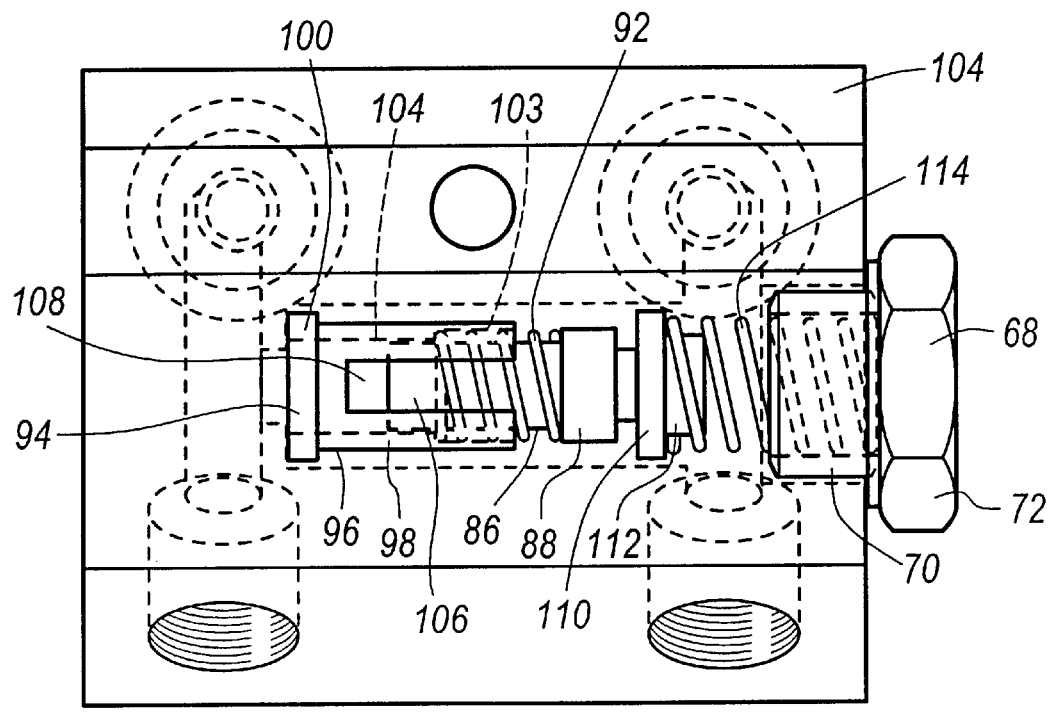
FIG. 11 is a top view of a valve utilizing the valve elements according to the third embodiment of the present invention in its opened position.
Figure 12:
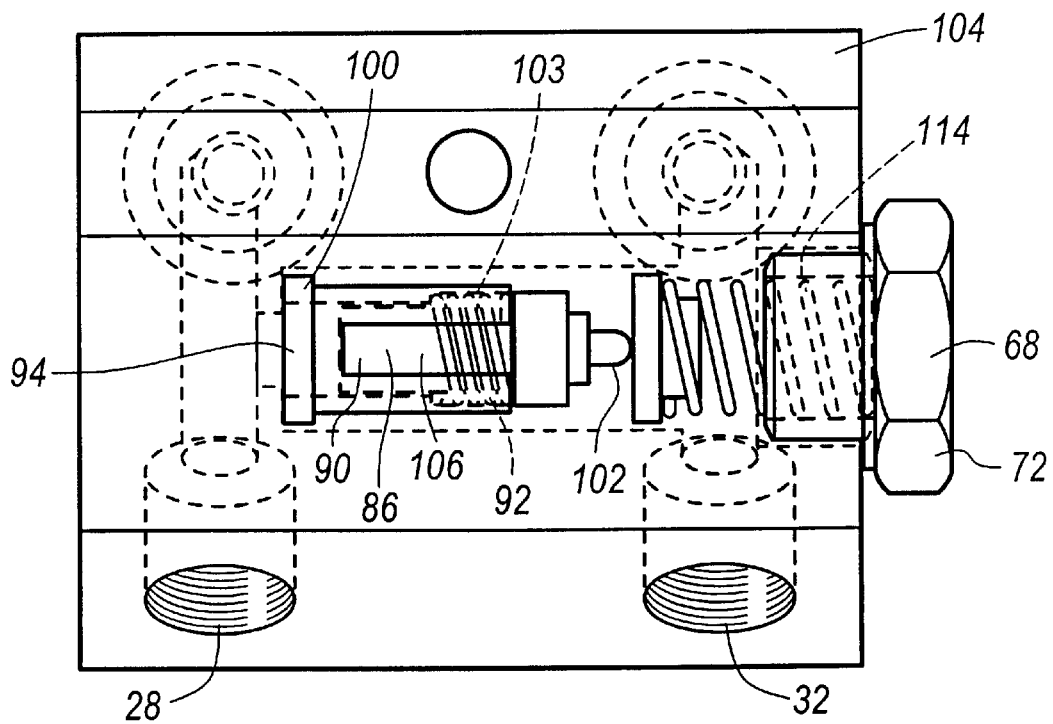
FIG. 12 is a top view of a valve in its closed position utilizing the valve elements of the third embodiment of the present invention.
Figure 13:
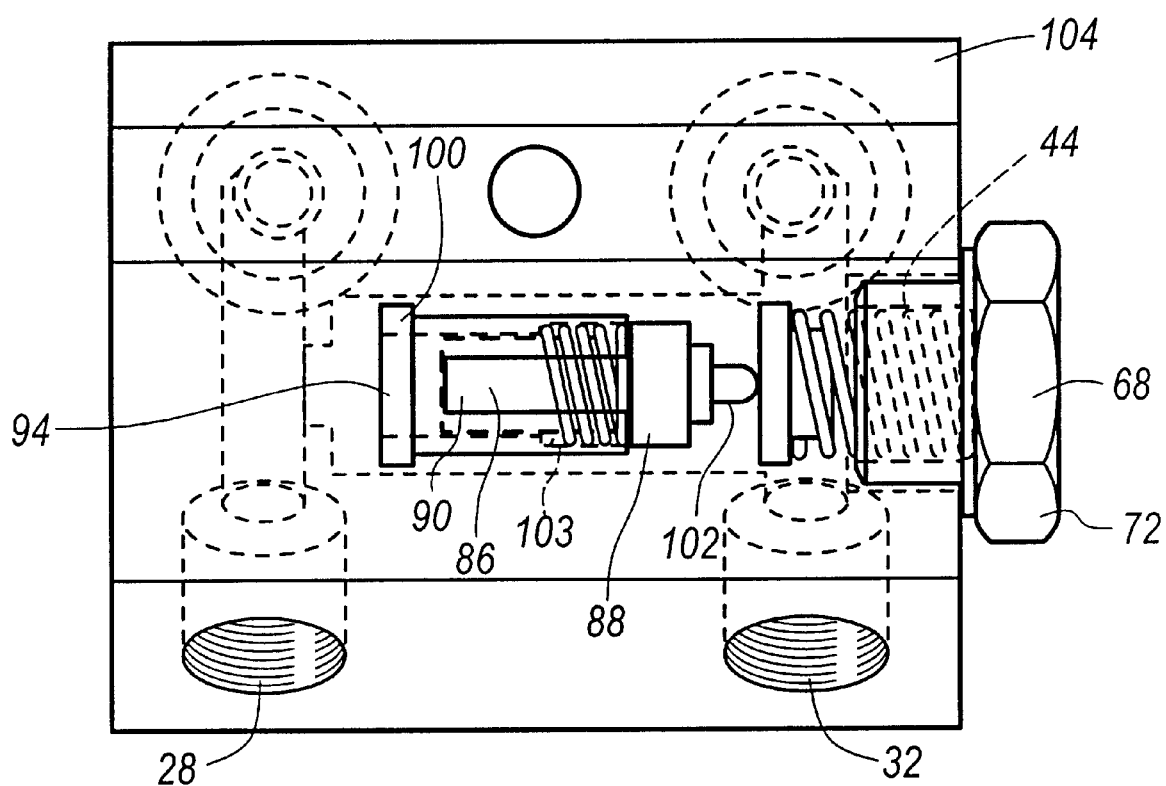
FIG. 13 is a top view of a valve utilizing the valve elements of the third embodiment of the present invention in its bypass mode.

Generally, with reference to FIGS. 11–13, shown is valve assembly 105 according to the third embodiment of the present invention. Depicted in FIG. 11 is the valve assembly 105 shown in its open position. Depicted is the sliding valve member 96 disposed about the exterior surface 90 of thermal member 86. Disposed between the thermal member 86 and the sliding valve member 96 is a first helical spring 92. The first helical spring functions to bias the thermal member 86 into a generally opened position allowing fluid to flow through the bypass passage 36 through flow passage 108. Intermediate bearing member 110 and a second helical spring 114 are configured to allow the proper relationship of these components.

Upon reaching an elevated temperature such as 180° F., piston member 102 is deployed from thermal unit 86. In doing so, thermal unit 86 is forced further into through bore 94 compressing first helical spring 92, and thus closing flow passage 108. The closing of port 108 is similar to that shown in embodiment two.

Should a situation occur when there is a malfunction of the cooling system, such as a blockage, a second helical spring 114 compresses under the pressure of the heated oil to allow fluid to flow around annular flange 100 of the sliding base member 96. It should be noted that typically, when there is a blockage in the cooling system, the temperature of the fluid to be cooled quickly rises. This causes the piston 102 of thermal element 86 to be extended, normally closing off the flow of fluid through bypass passage 36. By providing a thermal, as well as pressure bypass system, overall cooling system safety can be ensured.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A fluid bypass valve for use with a oil supply having oil fluid supply and return ports comprising:
   a valve housing defining an elongated bypass passage having a first valve seat, said bypass passage communicating with a fluid supply, fluid return, cooler supply, and cooler return ports, said valve housing being fluidly coupled to said oil fluid supply and return ports;
   a valve bearing element which is engageable with the first valve seat having a closed position for directing oil fluid from the fluid supply line to the cooler supply line for circulating through a cooler and from the cooler supply line to the fluid return line, and further having an open position for directing oil fluid from the fluid supply line back to the fluid return line;
   a thermally responsive actuator which moves the valve bearing element between the open and closed positions;
   a spring engaged between said valve member and said thermally responsive actuator and operative to urge said valve bearing toward said fist valve seat; and
   a second spring being disposed between said thermally responsive element and said valve housing, said second spring being compressible to enable movement of said thermally responsive valve member in a first direction under the influences of relatively high fluid pressure acting on one side of said thermally responsive valve member to allow the flow through said bypass passage into said fluid return line.

2. The fluid bypass valve of claim 1 wherein said valve housing defines an aperture, whereby said thermally responsive valve member is inserted into said bypass passage through said aperture.

3. The fluid bypass valve of claim 2 wherein said thermally responsive valve member further comprises a mounting member to fluidly seal said aperture.

4. The fluid bypass valve of claim 3 wherein the mounting surface defines input and output ports which are fluidly coupled to said oil supply unit fluid supply and return ports.

5. The fluid bypass valve of claim 4 further comprising a gasket disposed between said valve housing and said oil supply unit.

6. The fluid bypass valve of claim 5 wherein said mounting surface defines at least one annular groove disposed about one of said ports.

7. The fluid bypass valve of claim 6 wherein said gasket is an O-ring disposed within said annular groove.

8. The fluid bypass valve of claim 1 wherein said valve housing defines an aperture, whereby said valve member is inserted into said bypass passage through said aperture.

9. The fluid bypass valve of claim 8 wherein said thermally responsive actuator further comprises an annularly disposed star flange.

10. The fluid bypass valve of claim 9 wherein said valve housing defines a second valve seat which engages said star flange to axially position the thermally responsive actuator within the bypass passage.

11. The fluid bypass valve of claim 10 wherein said star flange allows fluid to flow through it when said star flange is seated against said second seat.

12. The fluid bypass valve of claim 1 further comprising an intermediate bearing member disposed between said thermally responsive actuator and said second spring.

13. The fluid bypass valve of claim 12 wherein said thermally responsive actuator comprises a retractable piston, said thermally responsive actuator configured to retract said piston thereby positioning the valve bearing element in its open position.

14. A fluid bypass valve for use with an oil supply having oil fluid supply and return ports, comprising:
   a housing defining an elongated bypass passage communicating with a fluid supply, fluid return, cooler supply, and cooler return ports, said valve housing being coupled to said oil supply and return ports, said valve housing further defining a first valve seat within said bypass passage;
   a sliding valve element defining a through bore;
   a thermally responsive actuator disposed at least partially within said through bore; and
   a first spring member disposed between said sliding valve element and said thermally responsive actuator, said thermally responsive actuator moveable within said axial bore to restrict the flow of fluid through the bypass passage.

15. The fluid bypass valve according to claim 14 further comprising an intermediate bearing member adjacent said thermally responsive actuator; and a second spring disposed between said intermediate bearing member and said valve housing, said second spring being compressible to enable movement of said thermally responsive valve member in one direction under the influence of high fluid pressure acting on one side of said thermally responsive actuator to allow the flow of oil through said bypass passage into said fluid return line.

16. The fluid bypass valve according to claim 15 wherein said thermally responsive actuator has a retractable piston engaged with said intermediate bearing member.

17. A fluid bypass valve for use with an oil supply having oil fluid supply and return ports, comprising:

a housing defining an elongated bypass passage communicating with a fluid supply, fluid return, cooler supply, and cooler return ports, said valve housing being coupled to said oil supply and return ports, said valve housing further defining a first valve seat within said bypass passage;

a sliding valve element defining a through bore;

a thermally responsive actuator disposed at least partially within said through bore; and a first spring member disposed between said sliding valve element and said thermally responsive actuator, said thermally responsive actuator moveable within said axial bore to restrict the flow of fluid through the bypass passage, wherein said sliding valve member has an annular ring which engages the first valve seat of the valve housing, said sliding valve member further defining a flow passage, said thermally responsive actuator operable to restrict flow through the flow passage at temperatures higher than a predetermined temperature.

18. The fluid bypass valve of claim 17 wherein said first spring is at least partially disposed within said axial bore.

19. The fluid bypass valve according to claim 17 wherein said flow passage is a notch whereby fluid flow through said axial bore and out said notch into said bypass passage.

* * * * *